(12) United States Patent
Shirazi

(10) Patent No.: US 12,527,564 B2
(45) Date of Patent: Jan. 20, 2026

(54) SURGICAL RETRACTOR

(71) Applicant: Flow Retractor AB, Gothenburg (SE)

(72) Inventor: Leila Shirazi, Gothenburg (SE)

(73) Assignee: Flow Retractor AB, Gothenburg (SE)

( * ) Notice: Subject to any disclaimer, the term of this patent is extended or adjusted under 35 U.S.C. 154(b) by 70 days.

(21) Appl. No.: 18/286,247

(22) PCT Filed: Oct. 29, 2022

(86) PCT No.: PCT/SE2022/050988
§ 371 (c)(1),
(2) Date: Oct. 10, 2023

(87) PCT Pub. No.: WO2023/075673
PCT Pub. Date: May 4, 2023

(65) Prior Publication Data
US 2024/0197308 A1    Jun. 20, 2024

(30) Foreign Application Priority Data
Oct. 30, 2021  (SE) .................... 2130291-4

(51) Int. Cl.
*A61B 17/02*    (2006.01)
*A61B 90/00*    (2016.01)
*A61B 17/00*    (2006.01)

(52) U.S. Cl.
CPC .......... *A61B 17/0293* (2013.01); *A61B 17/02* (2013.01); *A61B 17/0206* (2013.01); *A61B 90/02* (2016.02); *A61B 2017/00477* (2013.01); *A61B 2017/00991* (2013.01)

(58) Field of Classification Search
CPC ................ A61B 17/02; A61B 17/0206; A61B 2017/0287; A61B 17/0293; A61B 90/02
See application file for complete search history.

(56) References Cited

U.S. PATENT DOCUMENTS

| | | |
|---|---|---|
| 1,707,689 A | 4/1929 | Sloan |
| 1,963,173 A | 6/1934 | Morin |
| 3,724,449 A | 4/1973 | Gauthier |
| 3,998,217 A | 12/1976 | Trumbull et al. |
| 5,520,610 A | 5/1996 | Giglio et al. |

(Continued)

FOREIGN PATENT DOCUMENTS

| | | |
|---|---|---|
| CN | 109567884 A | 4/2019 |
| EP | 3334326 A1 | 6/2018 |

(Continued)

OTHER PUBLICATIONS

Shirazi, Leila, International Patent Application No. PCT/SE2022/050988, Invitation to Pay Additional Fees, Feb. 2, 2023.

(Continued)

*Primary Examiner* — Larry E Waggle, Jr.
(74) *Attorney, Agent, or Firm* — Moore & Van Allen PLLC; W. Kevin Ransom

(57) ABSTRACT

A surgical retractor comprises an even number of at least four fixed-angle corner members coupled in telescopic manner, each second corner member being of female configuration and adjoining two corner members of male configuration, wherein opposite sides of the surgical retractor run mutually in parallel with each other.

8 Claims, 4 Drawing Sheets

(56) References Cited

U.S. PATENT DOCUMENTS

Figure 1:
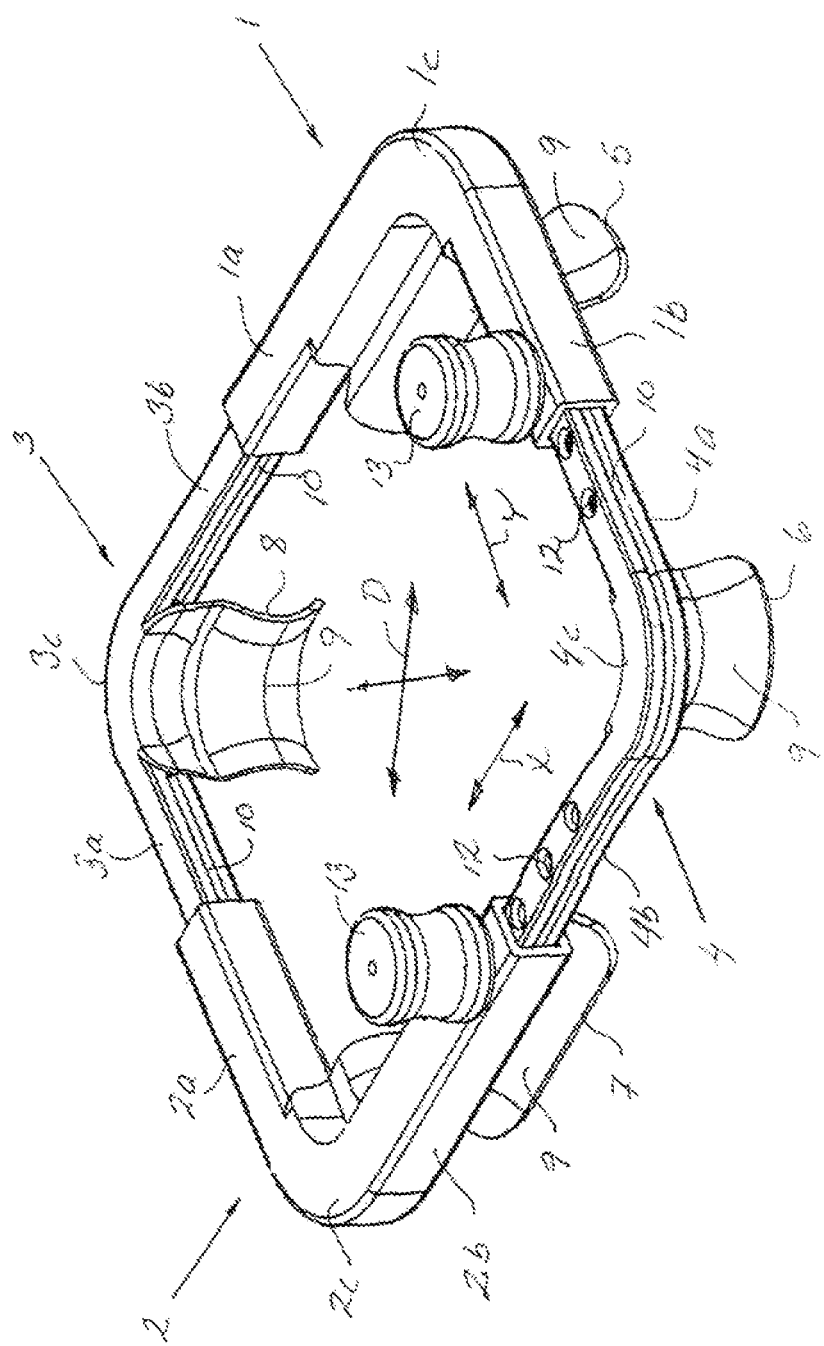

| | | | | |
|---|---|---|---|---|
| 6,051,007 | A * | 4/2000 | Hogendijk | A61B 17/08 |
| | | | | 606/151 |
| 6,547,725 | B1 * | 4/2003 | Paolitto | A61B 17/0293 |
| | | | | 606/139 |
| 7,758,501 | B2 * | 7/2010 | Frasier | A61B 17/02 |
| | | | | 600/233 |
| 8,366,754 | B2 * | 2/2013 | Teague | A61B 17/8076 |
| | | | | 600/233 |
| 10,470,836 | B2 * | 11/2019 | Yates | A61B 90/02 |
| 11,228,235 | B2 * | 1/2022 | Cestero | A61B 17/0206 |
| 2013/0211203 | A1 | 8/2013 | Sader et al. | |
| 2018/0035994 | A1 | 2/2018 | Gharibi Loron | |

FOREIGN PATENT DOCUMENTS

| | | | |
|---|---|---|---|
| EP | 3334326 | B1 | 5/2020 |
| GB | 1483048 | A | 8/1977 |
| SE | 403044 | B | 7/1978 |
| WO | 9403115 | A1 | 2/1994 |
| WO | 2010100592 | A1 | 9/2010 |
| WO | 2017027640 | A1 | 2/2017 |

OTHER PUBLICATIONS

Shirazi, Leila, International Patent Application No. PCT/SE2022/050988, International Search Report, Mar. 23, 2023.
Shirazi, Leila, International Patent Application No. PCT/SE2022/050988, Written Opinion, Mar. 23, 2023.
Shirazi, Leila, Swedish Patent Application No. 2130291-4, Swedish Search Report, Apr. 21, 2022.

* cited by examiner

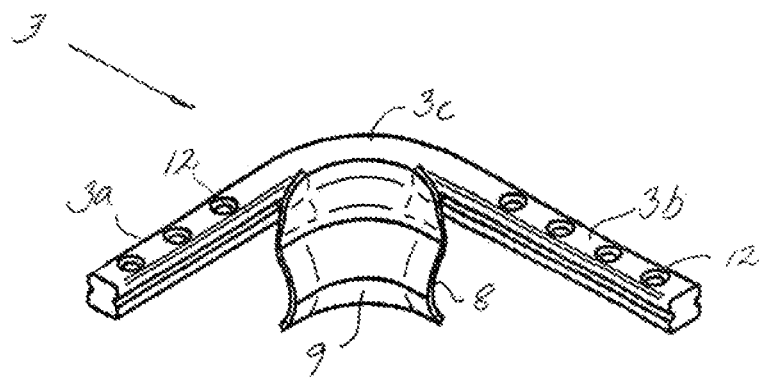
Fig. 6
Fig. 7
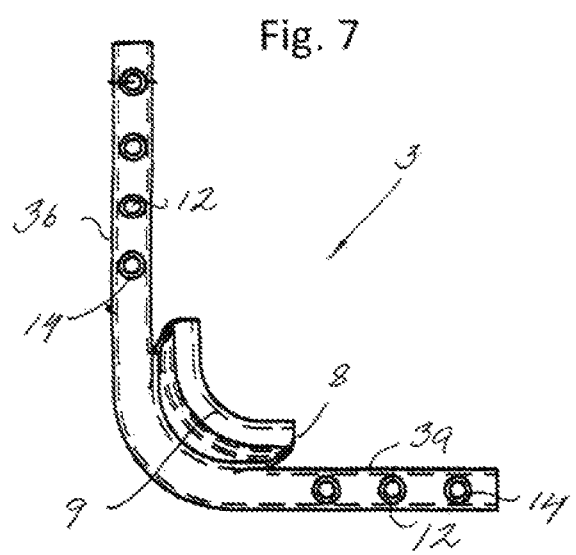
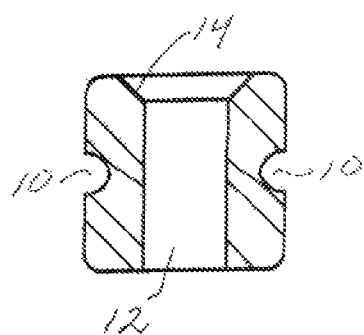
Fig. 9
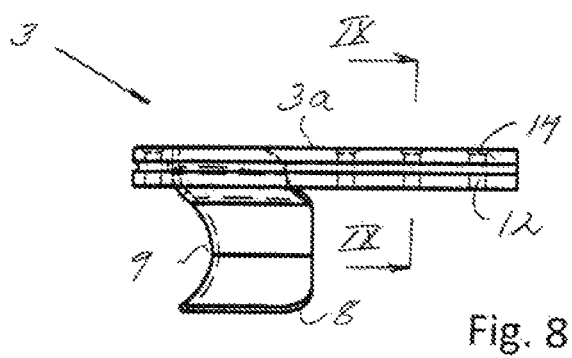
Fig. 8

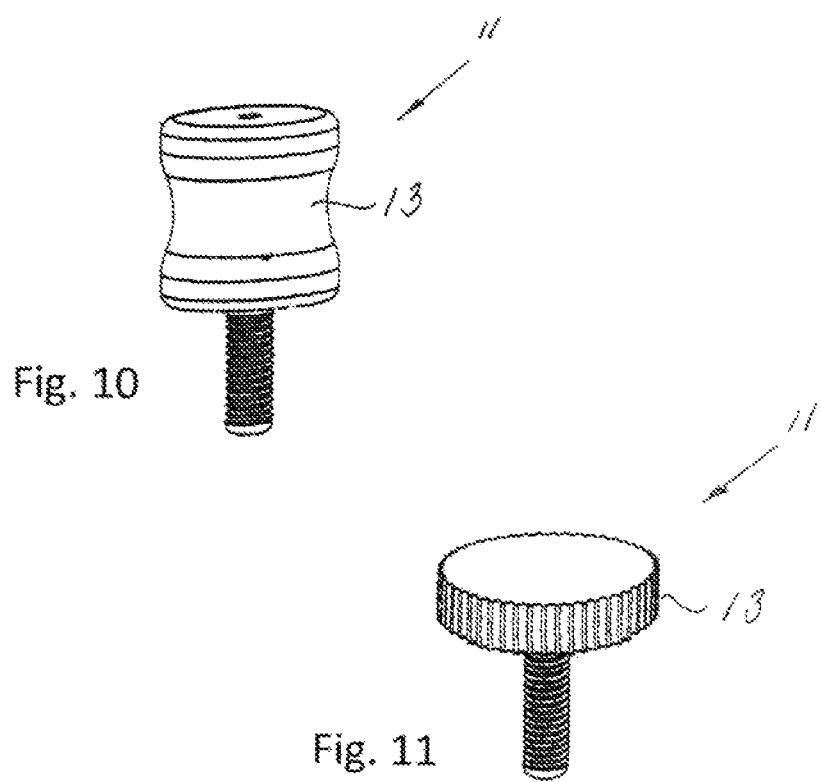

SURGICAL RETRACTOR

CROSS-REFERENCE TO RELATED APPLICATIONS

This application is a National Stage Patent Application (filed under 35 § U.S.C. 371) of PCT/SE2022/050988, filed Oct. 29, 2022, of the same title, which, in turn claims priority to Swedish Patent Application No. 2130291-4 filed Oct. 30, 2021, of the same title; the contents of each of which are hereby incorporated by reference.

TECHNICAL FIELD OF THE INVENTION

The present invention relates to a surgical retractor in the form of a device arranged for widening of a wound or incision, and for retracting body tissue and/or internal organs during surgical intervention on the human body or on animals.

BACKGROUND AND PRIOR ART

Surgical retractors are known for application in several types of surgery. Surgical retractors are typically equipped with adjustable hooks or blades that are shaped to pull the edges of a wound or an incision apart to provide access to deeper lying body tissue layers or internal organs for surgical intervention or operation. By use of a surgical retractor, the need for assistance by additional personnel to provide access to the operation site can be avoided.

Surgical retractors can be made available in several sizes and shapes for application in different types of surgery, such as in vascular surgery, thyroid surgery, abdominal wall surgery, or in surgical operation on the open abdomen.

Inguinal hernia, e.g., is a common diagnosis in Sweden as well as worldwide and is one of the most frequent operations to be performed by a surgeon. In year 2019, e.g., 16000 hernia operations were performed only in Sweden by the registered clinics (Swedish Hernia Register, SHR) and about 20 million hernia operations worldwide.

The technique used in inguinal hernia operations has been improved during the latest decades during which a mesh is typically applied in order to strengthen the tissue.

In inguinal hernia operations it is crucially important that the surgical instruments to be used are functional and provide free access to the operation site during the entire operation. Surgical retractors and hooks/blades must be able to uncover a rather narrow operation site while the mesh is applied and secured properly to avoid recurrence of the inguinal hernia.

To be suitable for use in hernia operations and other shallow surgical procedures, the surgical retractor should have hooks or blades of limited length in the sense of depth of penetration into the body.

Another requirement for surgical retractors is that hooks or blades shall be designed for staying in the wound and applying tension without causing stress or damage to body tissue and organs.

Still another requirement for surgical retractors is that they must be suitable for sterilization.

A non-complex architecture and ease of handling are other factors of great importance in a situation where the human or animal body is opened for surgery. It is also advantageous and desired that the surgical retractor is adaptable to patients of normal weight and to patients of excess weight as well.

Albeit surgical retractors in general, and surgical retractors intended for hernia operation particularly, are previously known, see for example U.S. Pat. No. 3,998,217 and WO 94/03115, there is room for improvement of surgical retractors currently in practice. Other examples of surgical retractors are disclosed in SE403044, US2013211203 and U.S. Pat. No. 3,724,449.

SUMMARY OF THE INVENTION

An objective for the present invention is to provide an improved surgical retractor.

Another objective for the present invention is to provide an improved surgical retractor for hernia operations.

Still another objective for the present invention is to provide a surgical retractor which requires a minimum of handling steps for application in the wound or operation site.

Several of these objectives are met in a surgical retractor device comprising at least two corner members of female configuration, each having two hollow arms interconnected at fixed angles; at least two corner members of male configuration, each having two arms interconnected at fixed angles, the arms of the male corner members insertable telescopically in a hollow arm respectively of adjoining female corner members; the male and female corner members in connected position forming a frame in which opposite sides of the frame are mutually in parallel and reversibly extendable; wherein a hook-shaped blade extends depending from the female and from the male corner members; and further comprising locking means arranged for releasable fixation of at least one of the male corner members with two adjoining female corner members.

An advantage and technical effect provided by the surgical retractor is that adjustment of the frame is positively controlled through the parallel arrangement of telescopically extendable/retractable arms. Application of the surgical retractor is simplified and the number of the handling steps required to apply the surgical retractor in the correct position is reduced.

In a preferred embodiment, the female corner members each comprises two hollow arms and a corner section forming an integrated, single-piece component. In a corresponding way, the male corner members each comprises two solid or hollow arms and a corner section forming an integrated, single-piece component. This embodiment is a non-complex structure which offers ease in handling during surgery, and ensures highest hygienic conditions through its eligibility for sterilization.

The female corner members and male corner members are preferably lying in substantially the same cross-sectional plane, i.e., in substantially the same horizontal cross-sectional plane when the surgical retractor is lying flat on a table top e.g.

In another embodiment, the hollow arms of the female corner members, as well as the arms of the male corner members, are interconnected through a curved corner section respectively. The design ensures a gentle application of the tension that is exerted on the wound edges and body tissue by the applied retractor.

In a further embodiment, an outwardly concave blade extends depending from the curved corner sections. More particularly, the blade follows at least partially the curved section of the corner member. In that sense, the blade forms a double curve including an outwardly concave curve as seen in a vertical plane through the blade, and an outwardly convex curve as seen in a horizontal plane through the blade.

In yet a further embodiment, the locking means comprises a locking pin that is optionally insertable in an optional one of a number of pinholes formed in the arms of a male corner member, at mating locations with a singular pin seat formed in an arm, respectively, of adjoining female corner members. Since the corner members are positively controlled and move in parallel upon adjustment, one single locking means needs unlocking in order to adjust the surgical retractor in one of the X- and Y-directions.

The locking pin may have a helical thread for threaded engagement with a threaded inner radius of the pin seat that is formed in the arm of the female corner member. The pinholes of the male corner member may be formed with a bevelled entrance for ease of insertion of the locking pin.

The arms of the female corner members and the arms of the male corner members may be quadrangular or square in cross sectional shape. Each of the alternatives prevents rotation between the corner members and provides sturdiness to the surgical retractor.

The arm of the male corner member may be formed with a longitudinally extending flute in at least one of its external surfaces. The flute or flutes provides escape for gas and fluid and avoids adhesion between the surfaces in sliding telescopic engagement between the corner members.

In a second aspect, the present invention provides a blade for a surgical retractor. The blade has a double-curve shape comprising an outwardly concave surface as seen in a first sectional plane through the blade, and an outwardly convex surface as seen in a second sectional plane through the blade, transversely to the first sectional plane.

Further details and advantages associated with the new surgical retractor will appear from the following detailed description.

SHORT DESCRIPTION OF THE DRAWINGS

Figure 2:
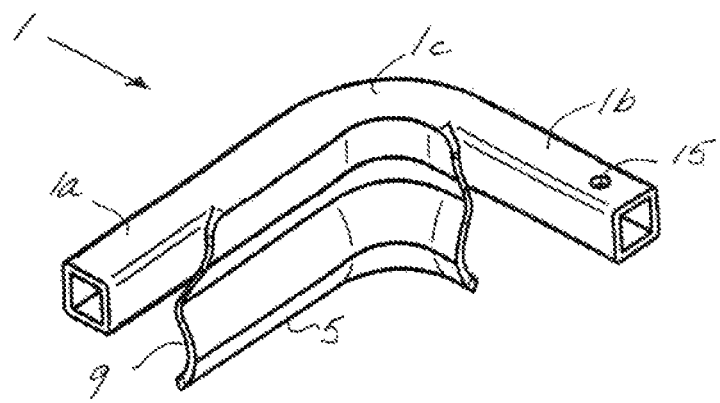
Figure 3:
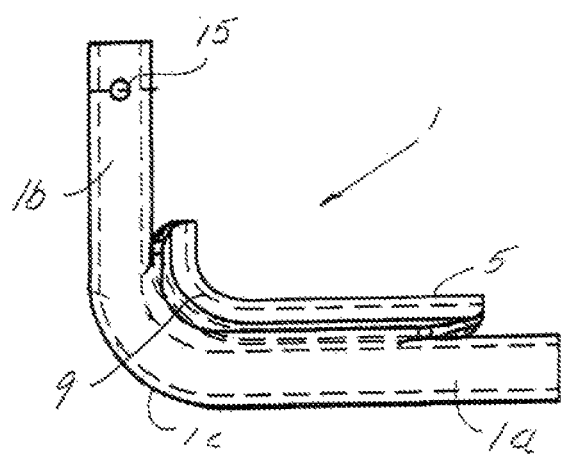
Figure 4:
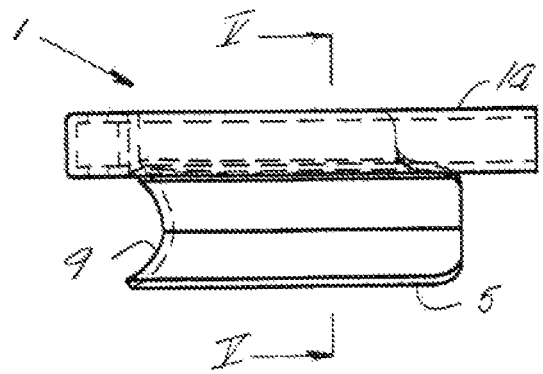
Figure 5:
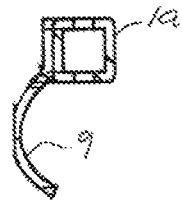

Embodiments of the present invention will be described below with reference made to the accompanying schematic drawings. In the drawings, FIG. 1 shows the assembled surgical retractor in three-dimensional view (3D-view), FIG. 2 is a 3D-view of a female corner member, FIG. 3 is a top elevation view of the female corner member seen in a horizontal plane, FIG. 4 is a side elevation view of the female corner member seen in a vertical plane, FIG. 5 is a sectional view in the vertical plane through an arm portion of the female corner member, FIG. 6 is a 3D-view of a male corner member, FIG. 7 is a top elevation view of the male corner member seen in a horizontal plane, FIG. 8 is a side elevation view of the male corner member seen in a vertical plane, FIG. 9 is a sectional view on a larger scale through an arm portion of the male corner member, FIG. 10 is 3D-view of a locking pin, and FIG. 11 is a 3D-view of a locking pin of alternative design.

DETAILED DESCRIPTION OF PREFERRED EMBODIMENTS

With reference to the drawings, a surgical retractor comprises female corner members and male corner members which combine in telescopic manner to form a frame wherein opposite sides of the frame are pairwise in parallel when the corner members are assembled.

The embodiment of FIG. 1 comprises a first female corner member 1 formed by two hollow arms 1a and 1b which are interconnected through a curved corner section 1c. In a similar way, a second female corner member 2 is formed by two hollow arms 2a and 2b which are interconnected through a curved corner section 2c. A first male corner member 3 is formed by two solid or hollow arms 3a and 3b which are interconnected through a curved corner section 3c. A second male corner member 4 is formed by two solid or hollow arms 4a and 4b which are interconnected through a curved corner section 4c.

In other words, the female corner members 1 and 2 each comprises two hollow arms and a corner section forming an integrated, single-piece component. In a corresponding way, the male corner members 3 and 4 each comprises two solid or hollow arms and a corner section forming an integrated, single-piece component.

Further, the female corner members 1 and 2 and male corner members 3 and 4 are lying in the same cross-sectional plane, i.e., in the same horizontal cross-sectional plane when the surgical retractor is lying flat on a table top, e.g.

The arms of the male and female corner members are angularly spaced in a common plane, i.e., in the horizontal plane when the surgical retractor is lying flat on a table top e.g. The angles between the arms of the male corner members as well as the angles between the arms of the female corner members are fixed. In the embodiment of the drawings, an intermediate angle $\alpha$ between the arms 1a, 1b and 2a, 2b of the female corner members 1 and 2 is equal to the intermediate angle $\beta$ between the arms 3a, 3b and 4a, 4b of the male corner members 3 and 4. In other words, in this embodiment, the intermediate angle at the corners is 90°, and the corner members 1-4 combine into a four-sided, rectangular frame when assembled.

In alternative embodiments, however, the arms of the corner members need not be spaced at right angles. In a regular hexagonal embodiment, e.g., the intermediate angle between the arms would amount to 120°, whereas in a regular octagonal embodiment the intermediate angle between arms would amount to 135°. Neither is it required in alternative embodiments that the intermediate angles $\alpha$ and $\beta$ are the same in both female corner members and male corner members. In a four-sided surgical retractor of rhombic shape, e.g., the intermediate angle between arms of the female corner members may be less than 90°, whereas the intermediate angle between arms of the male corner members accordingly would be more than 90°, or vice versa. In all cases, opposite sides of the frame should be pairwise in parallel in order to allow for telescopic expansion and retraction of the frame, in two or more directions, in the horizontal plane.

Accordingly, and expressed in other words, the surgical retractor comprises an even number of at least four fixed-angle corner members coupled in telescopic manner, each second corner member being of female configuration and adjoining two corner members of male configuration, wherein opposite sides of the surgical retractor run mutually in parallel with each other.

In the four-sided rectangular embodiment disclosed, each of the female corner members 1, 2 and the male corner members 3, 4 carries a hook-shaped blade 5, 6, 7 and 8 respectively, depending from the arms and/or from the curved corner sections 1c, 2c, 3c and 4c, below the horizontal plane of the frame. These blades are facing outwards from the frame with a concavely bent surface 9, see the vertical section of FIG. 5. However, inasmuch as a blade is attached to the arcuate shape of a curved corner section, the shape of the blade is curved in two planes, such that in a horizontal plane as seen in FIG. 7, e.g., the blade surface 9 also runs through an outward facing convex curve.

In this connection special attention is drawn to the fact, that in the illustrated embodiment the blades 5, 6, 7 and 8 are arranged and operative to effect widening of a wound or incision in the X- and Y-directions as well as in all diagonal directions D of the surgical retractor.

The arms of the female corner members 1, 2 are hollow and adapted for accommodation of the arms of the male corner members 3, 4 in telescopic manner. The arms of the male corner members can be solid or hollow. In the illustrated embodiment, the arms of the female and male corner members are quadrangular in cross-sectional shape. Other cross-sectional shapes, such as circular or oval, for example, are also conceivable.

In order to ensure free sliding movement in the telescopic coupling between the arms of the male and female corner members, a flute 10 can be formed in the exterior surface of the arms of the male corner members. Flutes 10 may advantageously be formed in two opposite sides of the arms 3a, 3b and 4a, 4b.

The surgical retractor can be fixated after adjustment into a number of positions and to different degrees of expansion in the X- and Y-directions separately. For fixation, a locking means 11, 12 comprises a locking pin 11 which is arranged for insertion in one of a number of pinholes 12 arranged in alignment in each of the arms 3a and 3b, or in the arms 4a and 4b, respectively, of the male corner members 3 and 4.

The locking pin 11 has a handle 13 in the upper end of the locking pin. The handle 13 may be oversized as illustrated in FIG. 10 or may be formed with a ribbed periphery as illustrated in FIG. 11, e.g., in order to facilitate handling by gloved hands during a surgery operation. The diameter of the locking pin 11 is adapted to fit into the diameter of the pinhole 12. The pinhole 12 may be formed with a bevelled entrance 14 in order to facilitate insertion of the locking pin.

Locking pins 11 are supported in pin seats 15 formed near the free ends of the arms 1a, 1b and/or in the free ends of the arms 2a, 2b of the female corner members 1 and 2, respectively. In the four-sided, rectangular embodiment of the frame of the surgical retractor, two locking pins seated in the arms of one female corner member is sufficient for positive fixation of the frame/surgical retractor in the adjusted position.

The locking pins 11 are accommodated in the pin seats 15 under threaded engagement between a helical thread formed on the exterior of the pin and a helical thread formed on the inner surface of the pin seat.

The components of the surgical retractor are preferably made in a material that permits sterilization after each use, such as stainless steel or surgical steel. Disposable versions of the surgical retractor may be produced in synthetic material, such as recycled plastic, if appropriate.

Alternatives to the above pin-and-pinhole combination are possible. An alternative locking means may include, e.g., a snap-lock means in the form of a biasing flexible tongue arranged in the arm of the female corner member that snaps into an optional one of a number of recesses or teeth formed in the arm of the male corner member. Another alternative locking means may include teeth arranged, e.g. in grooves, on the inside of the arm of the female corner member and teeth correspondingly arranged on the outside of the arm of the male corner member which teeth are brought into engagement with each other in a locking position. Still another alternative may include a spring-loaded ball seated in the arm of the female corner member and allowed to fall into an optional one of a number of ball seats formed in the arm of the male corner member. Yet another pin-and-pinhole combination may include non-threaded pins and non-threaded pin seats, wherein a bayonet-type coupling may be arranged to form a releasable locking engagement between the arm of the female corner member and the locking pin, or between the arm and the handle of the locking pin, or between the locking pin and the interior of the pinhole if appropriate.

Other modifications include exchangeable blades, or blades that can be moved along the arms of the male and female corner members to alternative positions on the frame. For example, exchangeable blades can be arranged for insertion in channels formed in the lower side of the male or female corner members. In embodiments with exchangeable blades, the blade may be produced in a material that makes the blade a disposable component of the surgical retractor.

It will be understood that the surgical retractor disclosed herein can be sized and dimensioned for different kinds of surgery on children and adults of normal weight and overweight as well. Hence, the dimensions given below are to be understood as non-limiting examples only.

Thus, an embodiment of the surgical retractor adapted for hernia surgery may include, for example, arm lengths in the order of about 50-120 mm in both male and female corner members. If appropriate, the two arms of the same corner member may be equal in length, or one arm may be longer than the other as in the embodiment illustrated in the drawings. Arms of the female corner members may have an outer width of about 10×10 mm and an inner width of about 6×6 or 7×7 mm in order to accommodate the arms of the male corner members having a corresponding outer width of about 6×6 or 7×7 mm. The blades, depending from the male and female corner members, may extend to about 10-50 mm in width as seen from the lower plane of the corner members to the lower edge of the blade when these are oriented horizontally. The length of the blades may vary from about 10 mm to about 100 mm. In a square or rectangular surgical retractor this size, the inner diagonal distance D between diagonally opposite blades, may be extended from approximately 70 mm to approximately 120 mm.

The surgical retractor of the present invention results in a number of advantages and is beneficial for both the surgeon and for the patient:

the surgical retractor can pull the edges of a wound or incision in all directions from its centre during the entire operation sequence, the surgical retractor can be correctly applied in the wound or incision without extensive training, has a non-complex structural design and is easy to handle by a surgeon, the surgical retractor is suited for cleaning, sterilization and reuse, the surgical retractor facilitates surgery with a reduced number of assisting personnel required, the surgical retractor improves training since students may concentrate on the operation rather than being occupied by pulling surgery hooks, the surgical retractor saves time, and results in shorter interventions, the surgical retractor avoids uneven application of tension on the edges of a wound or incision, reduces the risk of damage or necrosis, and minimizes the risk for infection, the surgical retractor reduces any risk of haemorrhage in cutaneous and subcutaneous tissue, the surgical retractor is useful for surgical interventions in the hernia region, for thyroid gland operations, for skin tumour operations, for operations in the abdominal cavity, as well as in connection with different kinds of surgical operations on children.

The invention claimed is:

1. A surgical retractor comprising:
   at least two female corner members, each having two hollow arms having respective first ends interconnected to each other at fixed angles;
   at least two male corner members, each having two arms having respective first ends interconnected at fixed angles, wherein each arm of a male corner member comprises a second end configured to be insertable telescopically in the hollow arm of an adjoining female corner member, wherein the at least two male and the at least two female corner members collectively form when interconnected a frame in which opposite sides of the frame are mutually in parallel and reversibly extendable in telescopic manner;
   a respective blade extending from each of the female and the male corner members; and
   locking means arranged for releasable fixation of at least one of the male corner members with two adjoining female corner members,
   wherein the hollow arms of the at least two female corner members and the arms of the at least two male corner members are respectively interconnected at their first ends through a curved corner section respectively, and
   wherein the blade extends at least partially from the curved corner section of either the male or the female corner member, the blade forming a double curve including an outwardly concave curve as seen in a first or vertical plane through the blade, and an outwardly convex curve as seen in a second or horizontal plane through the blade.

2. The surgical retractor of claim 1, wherein the at least two female corner members each comprises a corner section, the two hollow arms forming an integrated, single-piece component with the corner section, and wherein the at least two male corner members each comprises a corner section, the two arms being solid or hollow and forming an integrated, single-piece component with the corner section.

3. The surgical retractor of claim 1, wherein the locking means comprises a locking pin that is optionally insertable in one of a number of pinholes formed in the arm of a respective male corner member, at mating locations with a singular pin seat formed in the arm of an adjoining female corner member.

4. The surgical retractor of claim 3, wherein the locking pin comprises a helical thread for threaded engagement with a threaded inner radius of the pin seat.

5. The surgical retractor of claim 3, wherein the pinhole of the respective male corner member comprises a bevelled entrance.

6. The surgical retractor of claim 1, wherein the hollow arms of the at least two female corner members and the arms of the at least two male corner members are quadrangular in cross sectional shape.

7. The surgical retractor of claim 6, wherein the arms of the at least two male corner members are formed with a longitudinally extending flute, respectively, in at least one of its external surfaces.

8. The surgical retractor of claim 1, wherein the arms of the at least two male corner members and the arms of the at least two female corner members are interconnected at right angles, forming in an assembled mode a four-sided, square or rectangular frame.

* * * * *